US010723921B2

(12) United States Patent
Loy et al.

(10) Patent No.: US 10,723,921 B2
(45) Date of Patent: Jul. 28, 2020

(54) COUMARIN-MODIFIED EPOXY ADHESIVES

(71) Applicant: ARIZONA BOARD OF REGENTS ON BEHALF OF THE UNIVERSITY OF ARIZONA, Tucson, AZ (US)

(72) Inventors: Douglas A. Loy, Tucson, AZ (US); Pamela B. Vandiver, Tucson, AZ (US); Nancy N. Odegaard, Tucson, AZ (US); Kevin M. Frederick, Tucson, AZ (US); Peter McFadden, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 7 days.

(21) Appl. No.: 16/074,007

(22) PCT Filed: Jan. 27, 2017

(86) PCT No.: PCT/US2017/015316
§ 371 (c)(1),
(2) Date: Jul. 30, 2018

(87) PCT Pub. No.: WO2017/132497
PCT Pub. Date: Aug. 3, 2017

(65) Prior Publication Data
US 2019/0040287 A1    Feb. 7, 2019

Related U.S. Application Data

(60) Provisional application No. 62/288,904, filed on Jan. 29, 2016, provisional application No. 62/288,932, filed on Jan. 29, 2016.

(51) Int. Cl.
*C09J 11/06*    (2006.01)
*C09B 57/02*    (2006.01)
(Continued)

(52) U.S. Cl.
CPC ............ *C09J 11/06* (2013.01); *C08K 5/1545* (2013.01); *C09B 57/02* (2013.01); *C09J 163/00* (2013.01); *C09B 69/109* (2013.01)

(58) Field of Classification Search
CPC ...................................................... C09J 11/06
See application file for complete search history.

(56) References Cited

U.S. PATENT DOCUMENTS

| 3,541,097 A | 11/1970 | Beyerle et al. |
| 4,724,031 A * | 2/1988 | Monnier ............ C08G 59/3218 156/307.3 |

(Continued)

OTHER PUBLICATIONS

Lee et al. 'Photodependent Release from Poly(vinyl alcohol)/Epoxypropoxy Coumarin Hydrogels'. Journal of Applied Polymer Science, 2012. vol. 124, pp. 4339-4345.

(Continued)

*Primary Examiner* — Daniel H Lee
(74) *Attorney, Agent, or Firm* — Nguyen Tarbet

(57) ABSTRACT

Coumarin modification of epoxies provide for epoxy adhesives that fluoresce under short wave ultraviolet irradiation while remaining invisible under normal light. Furthermore, these modified epoxy adhesives can have increased adhesive bond strengths. In addition, photochemical curing of an epoxy modified coumarin and a hardening agent with UV irradiation at certain wavelengths affords an epoxy adhesive composition. Further UV irradiation of the composition at certain wavelengths causes photoscission, which breaks the crosslinks that make the cured epoxy adhesive insoluble and intractable.

19 Claims, 2 Drawing Sheets

(51) Int. Cl.
*C08K 5/1545* (2006.01)
*C09J 163/00* (2006.01)
*C09B 69/10* (2006.01)

(56) References Cited

U.S. PATENT DOCUMENTS

| | | | |
|---|---|---|---|
| 5,100,802 A * | 3/1992 | Mickols | G01N 21/6408 436/172 |
| 5,760,337 A | 6/1998 | Iyer | |
| 6,057,381 A | 5/2000 | Ma | |
| 6,271,335 B1 | 8/2001 | Small | |
| 6,403,753 B1 | 6/2002 | Loy | |
| 6,410,926 B1 * | 6/2002 | Munro | C08G 59/1422 250/302 |
| 2006/0025560 A1 | 2/2006 | Inoue | |
| 2007/0149711 A1 | 6/2007 | Chaudhary | |
| 2012/0082840 A1 | 4/2012 | Herr | |
| 2012/0182693 A1 | 7/2012 | Boday | |
| 2012/0261064 A1 | 10/2012 | Boday | |
| 2014/0262192 A1 | 9/2014 | Boday | |
| 2016/0237311 A1 | 8/2016 | Mizori | |
| 2017/0008998 A1 | 1/2017 | Sodano | |
| 2017/0152405 A1 | 6/2017 | Aoyama | |
| 2019/0047211 A1 | 2/2019 | Herring | |
| 2019/0315934 A1 | 10/2019 | Zelisko | |
| 2019/0322785 A1 | 10/2019 | Menyo | |

OTHER PUBLICATIONS

Ellis, B. ed. Chemistry and Technology of Epoxy Resins. Springer. 1st ed. 1993.

McFadden et al. UV Fluorescent Epoxy Adhesives from Noncovalent and Covalent Incorporation of Coumarin Dyes. ACS Appl. Mater. Interfaces, 2017, 9 (11), pp. 10061-10068.

* cited by examiner

COUMARIN-MODIFIED EPOXY ADHESIVES

CROSS REFERENCE

This application claims priority to U.S. Provisional Patent Application No. 62/288,904 filed Jan. 29, 2016 and U.S. Provisional Patent Application No. 62/288,932 filed Jan. 29, 2016 the specification(s) of which is/are incorporated herein in their entirety by reference.

GOVERNMENT SUPPORT

This invention was made with government support under Grant No. 1241783 awarded by NSF. The government has certain rights in the invention.

FIELD OF THE INVENTION

The present invention relates to coumarin-modified epoxy adhesives. In some embodiments, the coumarin-modified epoxy adhesive fluoresces blue under shortwave ultraviolet (UV) radiation. In other embodiments, the coumarin-modified epoxy adhesive is a reversible, UV cured thermoset that can harden with long wave UV and break apart to a liquid starting material with short wave UV.

BACKGROUND OF THE INVENTION

Epoxies are an important class of thermosetting polymers that are extremely robust. Their durability resulting in it being the material of choice for many long term applications such as adhesives, structural materials, paints, coatings, potting, printed circuit boards, microelectronic encapsulation, and other consumer goods. Epoxy resins are hardened or cured by a cross-linking reaction. The properties and applications of cured resin are greatly influenced by the choice of the hardener formulation and/or the method of curing. The cross-linking reactions are essentially irreversible. Therefore, the material cannot be melted and reshaped without decomposition of the material. Hence, the removal, recycling and reworkability of epoxies are notoriously difficult, which raises concerns about the longevity of epoxy-based materials in the environment.

Development of a "reworkable" epoxy material would have implications in recycling, recovery, and waste disposal. Furthermore, an easily removable epoxy could expand the use of epoxies into new consumer markets. For instance, joints could be bonded with epoxy glue and any spill-over could be easily removed, even post-curing, while the joint remains bonded. As another example, epoxy based paints and varnishes could also be more easily removed.

In some applications, epoxies are used in art conservation as adhesives for artifact reconstruction and repair. For example, epoxy thermoset adhesives are attractive for art conservation because of their strength and good adhesion. However, while originally brown in color, the development of colorless epoxies has made it has become more difficult to detect repair work and even if adhesives have been used on an artifact. Fluorescent epoxies would allow for easy detection of the epoxy joints by simple visual inspection under ultraviolet (UV) light UV light, while remaining unnoticeable under normal display lighting. Furthermore, only minute amounts of fluorescent dye are needed to make the epoxy adhesive fluoresce. However, the non-covalently attached dye can leach or be extracted from the adhesive bond, thereby attenuating or eliminating the fluorescent signature. Furthermore, adding even small amounts of a dye to the epoxy can change the mechanical properties of the resulting thermoset, often weakening it through plasticization. Hence, there is a need for an epoxy adhesive composition that allows for visible fluorescence in the thermoset without diminishing the strength of the adhesive.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

In one embodiment of the present invention, a fluorescent dye that has an epoxy group attached was prepared so that it will covalently incorporate into the epoxy thermoset. The fluorescent dye monomer was synthesized by glycidylation of 7-hydroxycoumarin. In one embodiment, the dye is made by reacting 7-hydroxycoumarin with epichlorohydrin to afford 7-glycidyloxycoumarin that fluoresces blue under ultraviolet light. Small amounts of 7-glycidyloxycoumarin (0.001-0.01 M) was premixed into a polyamine hardening agent that is added to the epoxy precursor in order to form the desired thermoset. Less than 0.1 weight percent of the 7-glycidyloxycoumarin is needed to make the thermoset strongly fluorescent. Lap shear adhesive testing showed that addition of the coumarin to specialty conservation epoxy Epo-Tek 301 did not weaken the adhesive, but actually slightly strengthened it. Control experiments with non-covalently bound coumarin dye at the same concentration weakened the adhesive bonds, demonstrating the value of covalent attachment. None of the presently known prior references or work has the unique inventive technical feature of the present invention.

According to another embodiment, the present invention features photochemically reworkable epoxy adhesive compositions and methods of making thereof. In one embodiment, photochemically reworkable epoxy adhesive composition may comprise a reactive mixture of a hardening agent, and one or more monomers of a modified coumarin comprising an epoxide moiety. The one or more monomers of the modified coumarin may be bonded to the hardening agent via the epoxide moiety. Without wishing to limit the invention to a particular theory or mechanism, the composition is curable under ultraviolet (UV) irradiation at a first range of wavelengths. Further still, the composition is photochemically degradable by UV irradiation at a second range of wavelengths, which causes the cured epoxy adhesive to undergo a reversible photoscission. None of the presently known prior references or work has the unique inventive technical feature of the present invention.

BRIEF DESCRIPTION OF THE DRAWINGS

The features and advantages of the present invention will become apparent from a consideration of the following detailed description presented in connection with the accompanying drawings in which.

DESCRIPTION OF PREFERRED EMBODIMENTS

Figure 1A:
FIG. 1A-B shows a comparison of unmodified EpoTek epoxy (left), EpoTek with $10^{-3}$ M (middle) and $10^{-2}$ M (right) 7-glycidyloxycoumarin in normal light (FIG. 1A) and fluorescence under UV light (FIG. 1B).

As used herein, the term ASTM (American Society for Testing and Materials) standards are standards that are determined by the ASTM International organization, which develops and publishes voluntary consensus technical standards for a wide range of materials, products, systems, and services. ASTM standards are known to one of ordinary skill in the art.

As used herein, the term "lap shear strength" is defined as the shear strength of adhesives for bonding materials when tested on a single-lap-joint specimen. The test is applicable for determining adhesive strengths, surface preparation parameters and adhesive environmental durability. Examples of ASTM single-lap-joint shear tests include, but are not limited to, ASTM D1002 which specifies lap shear for metal to metal, ASTM D3163 for plastics joints, and ASTM D5868 for fiber reinforced plastics (FRP) against itself or metal.

As used herein, the term "shear modulus" or "shear moduli" is defined as a coefficient of elasticity for a shearing or torsion force. The shear modulus describes the elastic properties of a solid under the application of transverse internal forces, for instance, it is a measure of the ability of a material to resist transverse deformations.

As used herein, the term "Young's modulus", or "Tensile Modulus", or "Modulus of Elasticity" is defined as a number that measures the stiffness of a material, such as its resistance being deformed elastically (i.e. stretched or compressed) when a force is applied to it.

As used herein, the term "almost colorless" is defined as appearing to have little to no color under normal light to the naked eye. As used herein, the term "slightly yellow" defines as having a yellow tinge under normal light to the naked eye.

Examples of curing agents, or hardening agents, that can be used in accordance with the present invention include, but are not limited to, nitrogen-containing curing agents such as aliphatic amines and derivatives thereof, polyamides, polyamidoamines and imidazolines, ethyleneamines and derivatives thereof, adducts with epoxy functional materials, Mannich bases and association salts, ketimines and acrylonitrile adducts, propylenamines, higher alkylenediamines, fatty amines, polyetheramines, araliphatic amines, alicyclic aliphatic amines, dicyandiamide and biguanide derivatives thereof, cycloaliphatic polyamines and derivatives thereof, aromatic polyamines and derivatives, heat-cured aromatic amines, room temperature cured aromatic amines, hydrazine and hydrazides; oxygen-containing curing agents such as carboxylic acids and anhydrides, dicarboxylic acid cyclic anhydrides, tetracarboxylic acid di-anhydrides, phenol formaldehyde resins, and amino formaldehyde resins; sulfur-containing curing agents such as polysulphides and polymercaptans; and other miscellaneous curing agents such as amine-boron trihalide complexes, quaternary phosphonium salts, and cationic salts.

Fluorescent Coumarin-Modified Epoxy Adhesives

Referring now to FIG. 1-4, the present invention features a fluorescent epoxy adhesive composition comprising a reactive mixture of an epoxy resin, a hardening agent, and a fluorescent dye comprising an epoxide moiety. Without wishing to limit the invention to a particular theory or mechanism, the fluorescent dye can be bonded, preferably covalently, to the hardening agent via the epoxide moiety. Without wishing to limit the invention to a particular theory or mechanism, upon cure of the reactive mixture to form a cured epoxy adhesive, the bonding of the fluorescent dye to the hardening agent increases an adhesive bond strength of the cured epoxy adhesive as compared to a cured epoxy adhesive without the fluorescent dye.

According to another embodiment, the present invention features a method of adhering at least two substrate surfaces to each other. The method may comprise providing any of the fluorescent epoxy adhesive compositions described herein, applying the epoxy adhesive composition to the substrate surfaces and connecting the substrate surfaces together, and allowing cure of the epoxy adhesive composition that is applied to the substrate surfaces at a specific temperature and for a period of time, thereby forming a cured epoxy adhesive. In a preferred embodiment, the fluorescent dye causes the cured epoxy adhesive to fluoresce under shortwave ultraviolet irradiation. In some embodiments, the substrate surfaces are part of an artifact, and adhering the substrate surfaces to each other reconstructs the artifact.

In some embodiments, the specific temperature ranges from about 25° C. to 60° C. In other embodiments, the period of time is about 2 to 48 hours. For example, the curing of the reactive mixture is performed at 25° C. and for a period of 48 hours. As another example, the curing of the reactive mixture is performed at 60° C. and for a period of 2 hours.

According to yet another embodiment, the present invention features a method of making a two-part fluorescent epoxy adhesive comprising providing an epoxy resin component, and preparing a fluorescent hardener component by providing a fluorescent dye comprising an epoxide moiety, and dissolving the fluorescent dye in a curing agent to form the fluorescent hardening agent. Without wishing to limit the invention to a particular theory or mechanism, the fluorescent dye is bonded to the curing agent via the epoxide moiety. In some embodiments, upon cure of a reactive mixture of said epoxy resin component and said fluorescent hardener component, the cured fluorescent epoxy adhesive has an increased adhesive bond strength as compared to a cured epoxy adhesive without the fluorescent dye.

In some embodiments, the fluorescent epoxy adhesive compositions or epoxy adhesives described herein may be a thermoset.

In a preferred embodiment, the fluorescent dye comprises 7-glycidyloxycoumarin. In some embodiments, the fluorescent dye causes the cured epoxy adhesive to fluoresce under shortwave ultraviolet irradiation. In other embodiments, a concentration of 7-glycidyloxycoumarin ranges from about 0.001 M-0.1 M. Without wishing to limit the present invention to any theory or mechanism, this concentration may be effective to cause fluorescence of the epoxy adhesive without affecting its adhesive bond strength. In some embodiments, the epoxy adhesive composition may fluoresce blue when the concentration of the fluorescent dye is at most $10^{-1}$ M without reducing the adhesive bond strength.

In still other embodiments, a mole ratio of fluorescent dye to hardening agent to epoxy resin is about $10^{-4}$-$10^{-2}$ to 1 to 1.79-1.83. In further embodiments, the epoxy adhesive composition may comprise about 5.81 mmols to about 7.21 mmols of the epoxy resin, about 3.16 mmols to about 3.21 mmols of the hardening agent and about 0.003 mmol to about 0.023 mmol of the fluorescent dye.

According to some embodiments, the color of the epoxy adhesive may be dependent on a concentration of the fluorescent dye. In some embodiments, the epoxy adhesive may be almost colorless when the concentration of the chromophore epoxy monomer is $10^{-3}$ M. In other embodiments, the color of the epoxy adhesive may be slightly yellow when the concentration of the chromophore epoxy monomer is about $10^{-2}$ to $10^{-1}$ M.

In one embodiment, a lap shear strength of the cured epoxy adhesive ranges from about 26 MPa to 31 MPa. In another embodiment, a Young's modulus of the cured epoxy adhesive ranges from about 685 MPa to 704 MPa.

In some embodiments, the lap shear strength value of the epoxy adhesive is dependent on a range of concentration of the fluorescent dye. In a preferred embodiment, the lap shear strength value is highest when the concentration of the fluorescent dye is about $10^{-2}$ to $10^{-1}$ M. For instance, the lap shear strength is about 30.43±3.11 MPa and the shear modulus is about 682.35±16.67 MPa. In a preferred embodiment, when the concentration of the fluorescent dye is about $10^{-2}$ to $10^{-1}$ M, the lap shear strength value increases by about 10% as compared to an unmodified epoxy adhesive. In other embodiments, the lap shear strength is about 28.86±2.52 MPa and the shear modulus is about 686.08±16.72 MPa when the concentration of the fluorescent dye is about $10^{-3}$ M. In another embodiment, when the concentration of the fluorescent dye is about $10^{-3}$ M, the lap shear strength value increases by about 5% as compared to an unmodified epoxy adhesive.

Examples of epoxy resins include, but are not limited to, bisphenol A-epichlorohydrin resins, epoxy-novolacs, polyhydric phenols, amines (i.e. reaction products of epichlorohydrin with amines, halogen-containing epoxides, and cycloaliphatic resins. Additional examples of epoxy resins may comprise the following structures:

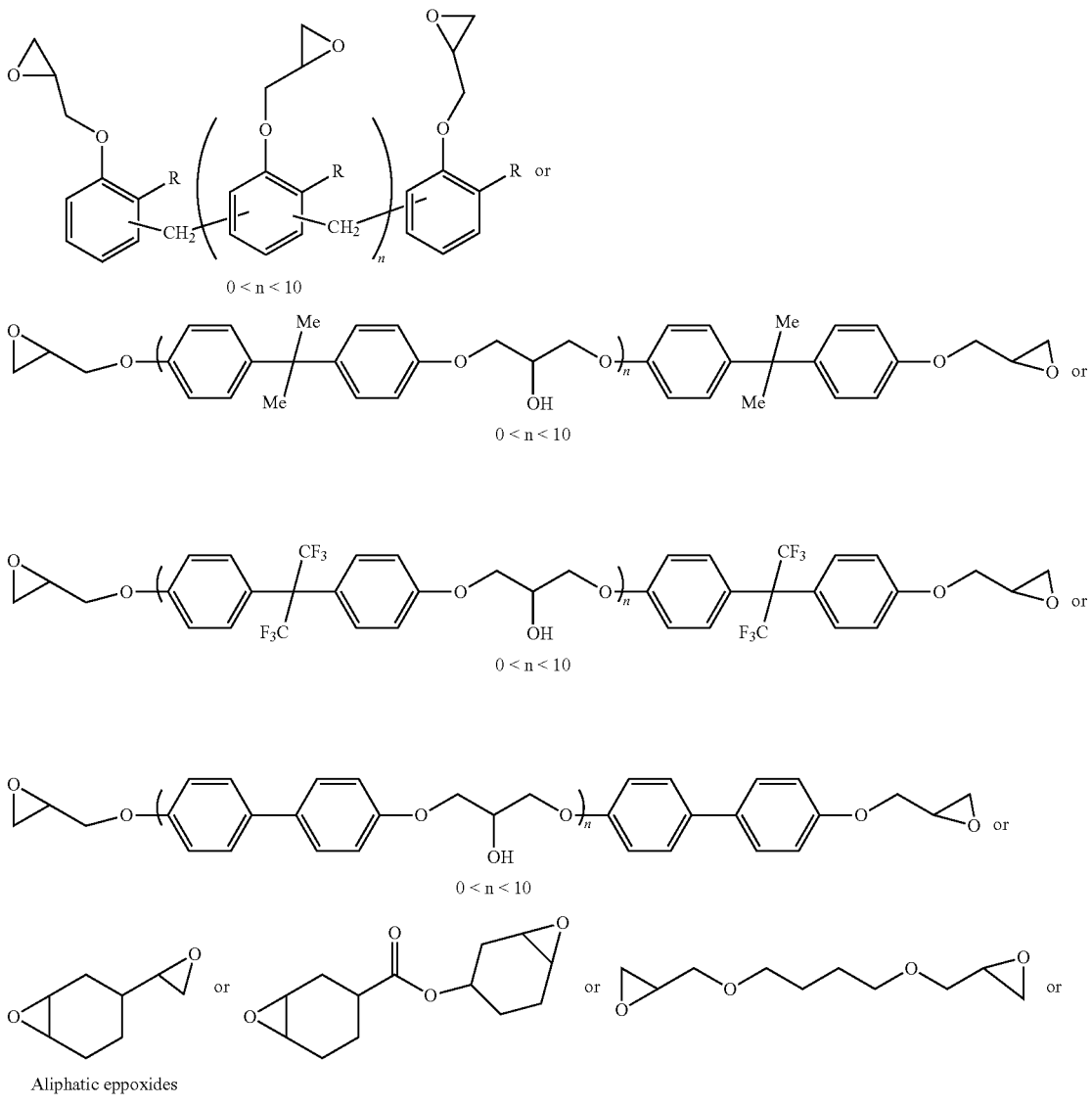

Aliphatic eppoxides

-continued

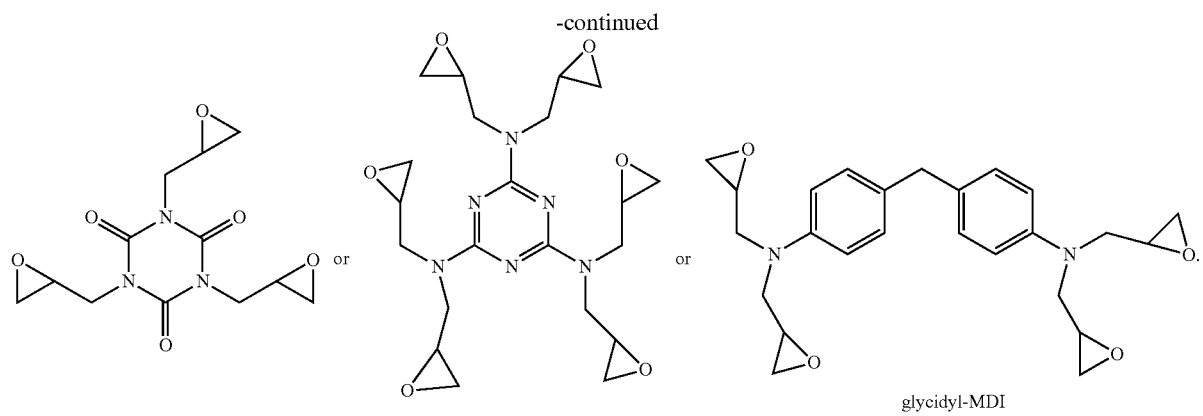

glycidyl-MDI

In one embodiment, the epoxy resin may comprise a mixture of a bisphenol component and an oligomer of the bisphenol component. For example, the bisphenol component may comprise a bis-glycidyloxybisphenol A. In another embodiment, the oligomer of the bisphenol component may comprise the following structure:

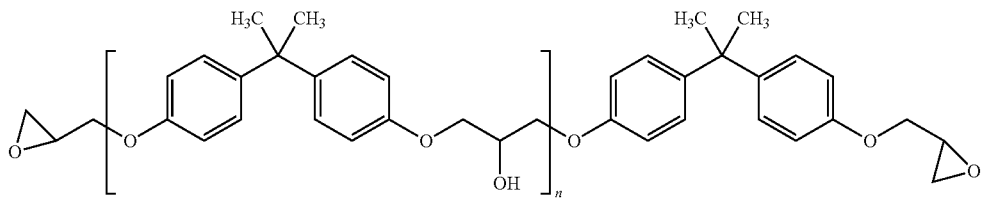

wherein $0 < n < 10$.

According to one embodiment, the hardening agent may comprise a mixture of aliphatic diamines, such as 2,4,4-trimethylhexane-1,6-diamine and 2,2,4-trimethylhexane-1,6-diamine. In one embodiments, the mixture of aliphatic diamines may be according to the following:

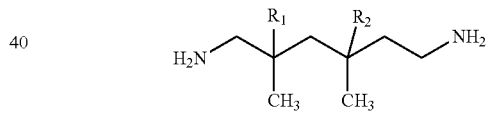

In one embodiment, $R_1$=hydrogen, $R_2$=methyl for 2,4,4-trimethylhexane-1,6-diamine. In another embodiment, $R_1$=methyl, $R_2$=hydrogen for 2,2,4-trimethylhexane-1,6-diamine.

According to some embodiments, the fluorescent hardening agent formed by dissolving the fluorescent dye in the hardening agent may comprise the following structure:

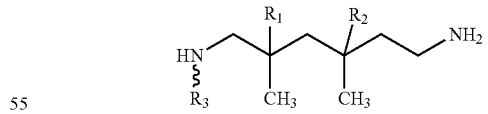

wherein $R_1$=H or methyl, $R_2$=H or methyl, and $R_3$ is according to the following:

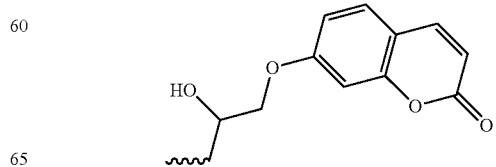

According to one embodiment, the epoxy adhesive formed by mixing the epoxy resin with the fluorescent hardening agent may comprise the following structure:

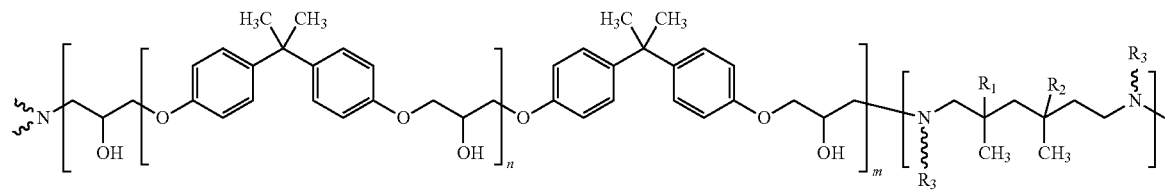

wherein $R_1$=H or methyl, $R_2$=H or methyl, m=1-100,000, n=0-10, and $R_3$ is according to the following structure:

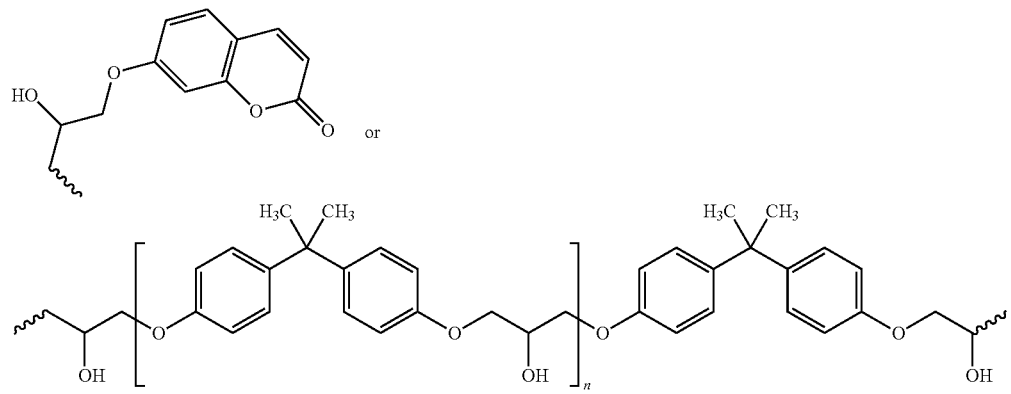

EXAMPLES

The following are non-limiting examples relating to UV fluorescent epoxy adhesives. It is to be understood that said examples are for illustrative purposes only, and are not intended to limit the invention in any way. Equivalents or substitutes are within the scope of the invention.

Materials:

Chemicals and solvents used were purchased from Sigma-Aldrich and used without purification unless otherwise stated. The epoxy and hardener (EpoTek 301) were obtained from Epoxy Technologies Inc., Billerica, Mass. The epoxy (Part A) is a mixture of bis-glycidyloxybisphenol A and a small amount of oligomers of the same. The hardener (Part B) is a mixture of 2,4,4-trimethylhexane-1,6-diamine and 2,2,4-trimethylhexane-1,6-diamine. Glassware was oven-dried prior to use. All reactions were carried out under an atmosphere of argon. Glass substrates were microscope slides (25×75×1 mm) purchased from VWR International and have a typical composition of borosilicate glass.

Instrumentation:

$^1$H NMR data were obtained on a AVIII-400 NMR spectrometer and chemical shifts were reported in part per million (δ). $^1$H NMR was internally referenced to tetramethylsilane (TMS) (δ 0.0) and $^{13}$C NMR chemical shifts were reported relative to the center peak of the multiplet for CDCl$_3$ (δ 77.0 (t)). Attenuated total reflectance—Fourier transform infrared (ATR-FTIR) analysis of neat samples was performed on a Thermo Nicolet-FTIR Spectrometer iS10 with a ZnSe ATR crystal apparatus. Melting points were determined with an XXX melt temp and are uncorrected.

Example 1

The following is a non-limiting example of synthesizing 7-(2,3-epoxypropoxy)coumarin (Scheme 1).

Scheme 1

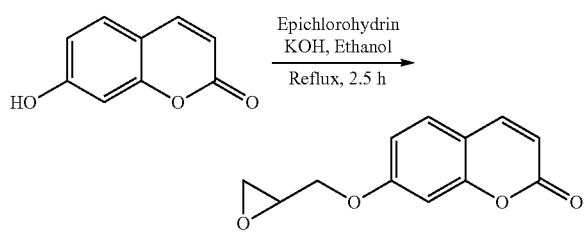

Referring to Scheme 1, to 7-hydroxycoumarin (1.624 g, 10.02 mmol) and epichlorohydrin (20 mL, 260 mmol) in ethanol (25 mL) in 100 mL round bottom flask equipped with magnetic stirrer, addition funnel, condenser and drying tube, KOH in ethanol (25 mL, 0.5 M) was added dropwise at room temperature. The mixture was refluxed for 2.5 h during which time the solution became transparent and dark red-brown in color. After cooling to room temperature, the solvent was removed by rotary evaporation and the brown solid residue remaining was extracted with chloroform (50 mL) and distilled water (40 mL). The red-brown organic phase was washed twice with water, dried over anhydrous MgSO4, and the solvent was rotary evaporated. The remaining light red-brown solids were recrystallized in ethanol to give short colorless needle-like crystals (1.71 g, 7.84 mmol, 78% yield). Melting Point: 115-116° C. (Literature 110-112° C.); $^1$H NMR (400 MHz, CDCl$_3$): 2.79 (dd, $^3$J=4.8, 2.6 Hz, 1H), 2.94 (dd, $^3$J=4.9, 4.1 Hz, 1H), 3.38 (ddt, $^3$J=5.9, 4.1, 2.7 Hz, 1H), 3.97 (dd, $^3$J=11.1, 5.9 Hz, 1H), 4.33 (dd, $^3$J=11.1, 2.8 Hz, 1H), 6.26 (d, $^3$J=9.5 Hz, 1H), 6.82 (d, $^3$J=2.5 Hz, 1H), 6.88 (dd, $^3$J=8.6, 2.5 Hz, 1H), 7.37 (dd, $^3$J=8.6, 0.3 Hz, 1H), 7.63 (d, $^3$J=9.5 Hz, 1H). $^{13}$C NMR (100 MHz, CDCl$_3$): δ 44.66, 49.89, 69.39, 101.79, 113.02, 113.08, 113.60, 128.99, 143.42, 155.90, 161.16, 161.68.

Example 2

The following is a non-limiting example of preparing a fluorescent hardener with one of the two diamine isomers present (Scheme 2).

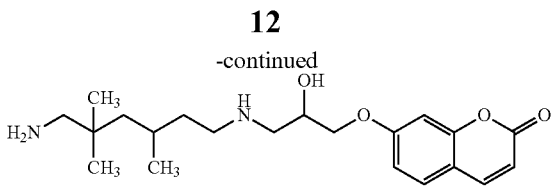

As shown in Scheme 2, 7-(2,3-epoxypropoxy)coumarin is reacted with the diamine hardener to produce the fluorescent hardener.

Example 3

The following are non-limiting examples of preparing fluorescent and non-fluorescent epoxy thermosets (Scheme 3).

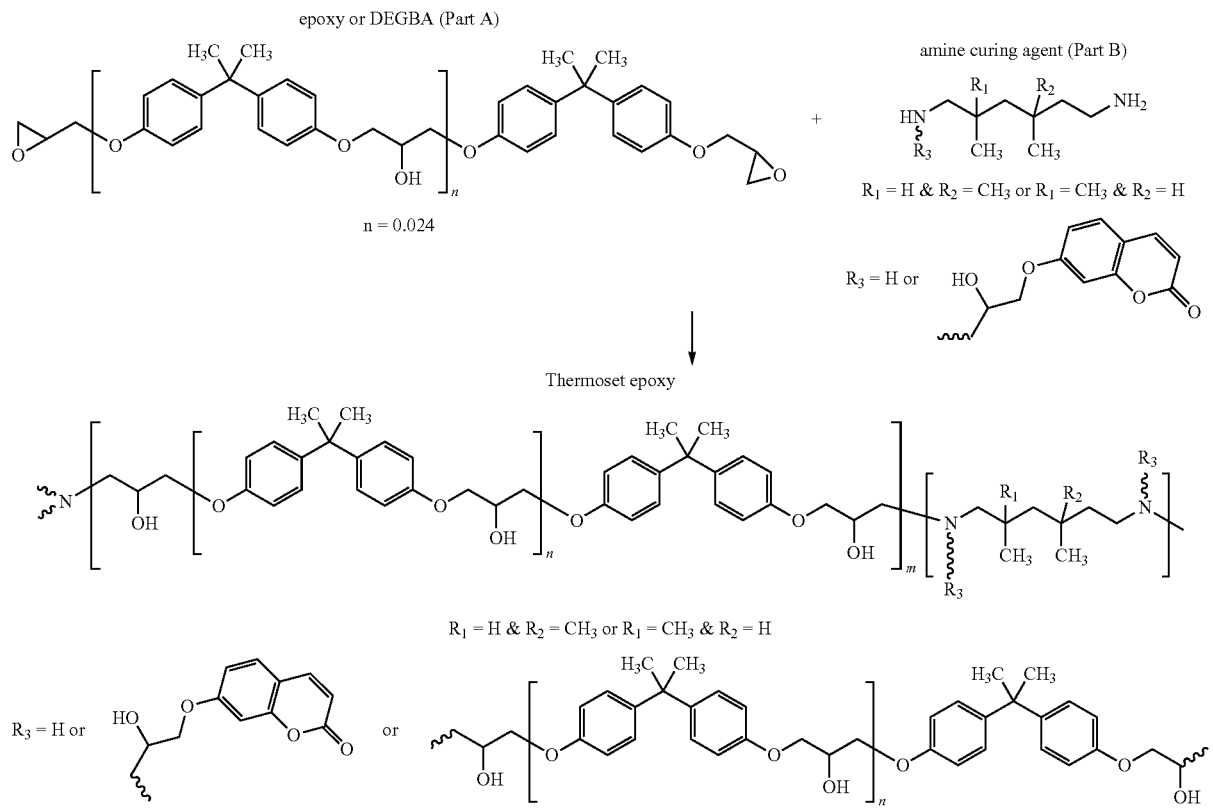

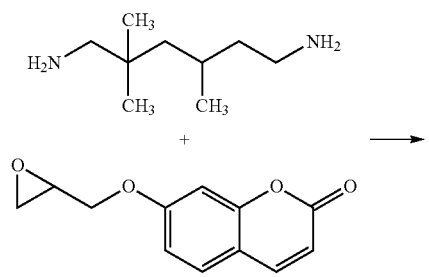

EpoTek 301 thermoset (Epoxy NON-C): EpoTek Part B (0.5046 g, 3.188 mmols) was mixed with EpoTek Part A (2.0229 g, 5.832 mmols). The mixture was applied to coupons and oven cured for 2 hours at 65° C. The cured epoxy was clear and colorless.

EpoTek 301 thermoset with 7-glycidyloxycoumarin (0.001 M) (Epoxy+C3): 7-glycidyloxycoumarin (0.0007 g, 0.003 mmols) was dissolved in EpoTek Part B (0.5042 g, 3.185 mmols). This was then mixed with EpoTek Part A (2.0185 g, 5.819 mmols). The mixture was applied to coupons and oven cured for 2 hours at 65° C. The cured epoxy was mostly clear and colorless with a very faint hint of yellow color.

EpoTek 301 thermoset with 7-glycidyloxycoumarin (0.01 M) (Epoxy+C2): 7-glycidyloxycoumarin (0.0050 g, 0.023 mmols) was dissolved in EpoTek Part B (0.5090 g, 3.216 mmols). This was then mixed with EpoTek Part A (2.0165 g, 5.814 mmols). The mixture was applied to coupons and oven cured for 2 hours at 65° C. The cured epoxy was mostly clear and colorless with a faint hint of yellow color.

EpoTek 301 thermoset with 7-hydroxycoumarin (0.01 M) (Epoxy+HC2): 7-hydroxycoumarin (0.0041 g, 0.023 mmols) was dissolved in EpoTek Part B (0.5055 g, 3.194 mmols). This was then mixed with EpoTek Part A (2.0277 g, 5.846 mmols). The mixture was applied to coupons and oven cured for 2 hours at 65° C. The cured epoxy was mostly clear and colorless with a faint hint of yellow color.

Example 4

The following is a non-limiting example lap shear testing.

Lap shear tests involved bonding of two aluminum coupons via an overlap using a standard ASTM method for testing adhesive strengths. The current coupons used were 1"×4"×0.064". Each measurement was conducted at least six times for precision. Coupons were rinsed twice with acetone to remove any oils and all ink marks, then chromic acid etched to remove excess surface oxide. The coupons were rinsed and dried before applying adhesive formulations. Four different formulations were tested. The first formulation (Epoxy NON-C) was EpoTek 301 resin (2.5 g) and the amine terminated hardening agent (0.5 g). The next two formulations (Epoxy+C3, Epoxy+C2) had small amounts of the 7-glycidyloxycoumarin added to the hardening agent. The last formulation (Epoxy+HC2) had a similar amount of 7-hydroxycoumarin added for comparison. For the adhesives containing coumarin, the adhesives were prepared from 2.5 g EpoTek 301 resin, where 0.5 g Part B (diamine) was mixed first with a coumarin compound and after homogenization, 2 g Part A (Epoxy) was added.

Table 1 shows the epoxy adhesives tested for Lap Shear test and their respective coumarin concentrations.

| Adhesive | Coumarin | Conc. |
|---|---|---|
| Epoxy NON-C | None | — |
| Epoxy + C3 | 7-glycidyloxycoumarin | $10^{-3}$ M |
| Epoxy + C2 | 7-glycidyloxycoumarin | $10^{-2}$ M |
| Epoxy + HC2 | 7-hydroxycoumarin | $10^{-2}$ M |

All coupons were marked at 0.2 inch from edge for overlap and 0.25 inch for space beyond the overlap, that also was covered with adhesive. A thin adhesive layer was applied on both coupons and overlap was hold with tow binder clips. Coupons were cured for 2 hours at 65° C., and then cooled. Tension tests were done with an MTS Criterion stress strain analyzer with aluminum coupons (width was 1", lap length was 0.2") at 0.13 cm/min, with a data acquisition rate of 100 Hz. Samples were clamped at 63 mm from the overlap end, and tested with the program "MTS EM Tension (Simplified) Epoxy LapShear 1".

The lap shear adhesion measurements were taken on the fluorescent epoxies made with $10^{-2}$ and $10^{-3}$ M 7-glycidyloxycoumarin (Table 2). These were compared to the unmodified EpoTek and EpoTek modified with $10^{-3}$ M 7-hydroxycoumarin. EpoTek without additives exhibited a lap shear strength of 27.56 MPa and a Young's modulus of 675.6 MPa, which is comparable to reports for similarly prepared epoxies. Addition of $10^{-3}$ M of 7-glycidyloxycoumarin resulted in a fluorescent epoxy having stronger adhesive bonds with a 5% increase in lap shear and 2% increase in modulus. With $10^{-2}$ M of 7-glycidyloxycoumarin, the lap shear strength of the fluorescent epoxy was 10% higher than the unmodified control epoxy. In contrast, the epoxy modified with 7-hydroxycoumarin diminished in lap shear strength by 6%.

TABLE 2

Comparison of epoxy bond strength in modified epoxies under varied concentrations of 7-glycidyloxycoumarin as compared to unmodified or non-covalently bonded epoxy.

| Adhesive Sample | Coumarin Conc. (M) | Lap Shear Strength (MPa) | Young's modulus (MPa) |
|---|---|---|---|
| EpoTek | 0 | 27.56 ± 2.38 | 675.62 ± 24.10 |
| EpoTek + 7-glycidyloxycoumarin | $10^{-3}$ | 28.86 ± 2.52 | 686.08 ± 16.72 |
| EpoTek + 7-glycidyloxycoumarin | $10^{-2}$ | 30.43 ± 3.11 | 682.35 ± 16.67 |
| EpoTek + 7-hydroxycoumarin | $10^{-2}$ | 26.18 ± 2.78 | 711.80 ± 10.06 |

Figure 1B:
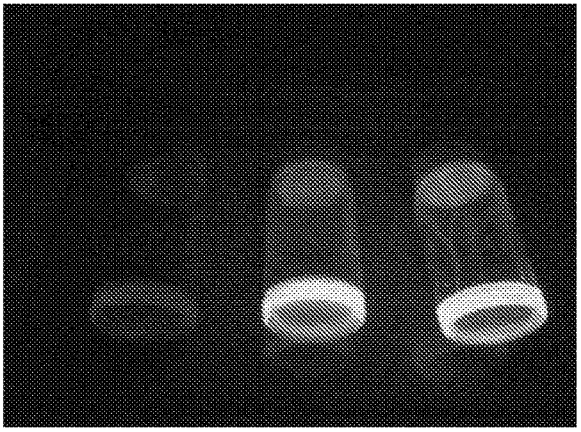

Like most coumarins, 7-glycidyloxycoumarin fluoresces bright blue when exposed to ultraviolet light. The dye was premixed into the mixture of diaminohexanes in the hardening agent to ensure covalent incorporation and prevent leaching. The glycidyl epoxide group reacts quickly with the thousand fold excess of amine. At $10^{-3}$ M, the fluorescence was clearly visible in bulk samples despite being invisible to NMR spectroscopy. At $10^{-1}$ M, the modified hardener did appear slightly yellow. Reaction of the 7-glycidyloxycoumarin-modified hardening agent with the epoxy prepolymer afforded a transparent, slightly yellow thermoset in the same time as the unmodifed adhesive or the adhesive with a similar amount of 7-hydroxycoumarin added, as shown in FIG. 1.

Figure 2:
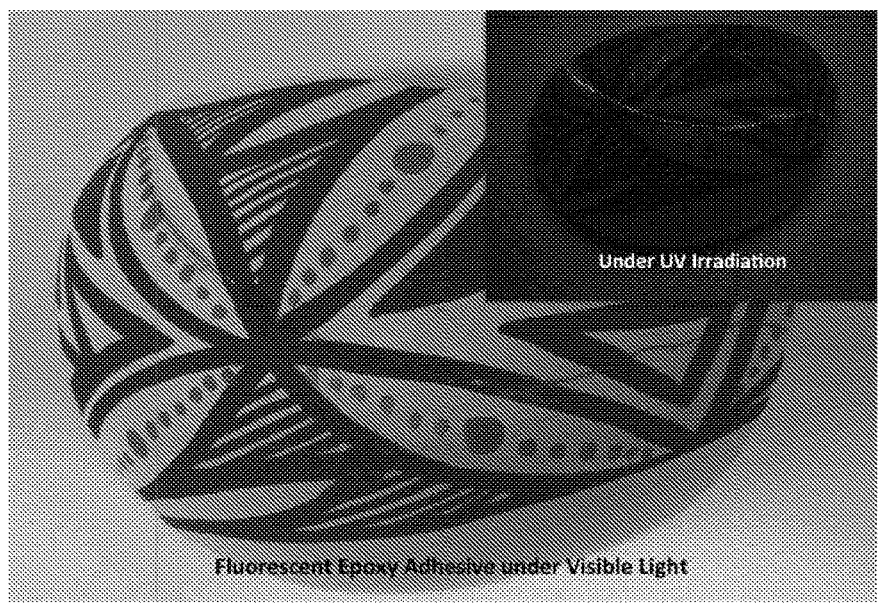
FIG. 2 shows an artifact reconstruction work using the fluorescent epoxy adhesive of the present invention. The artifact is shown in visible light and under short wave UV irradiation (insert).
Figure 3:
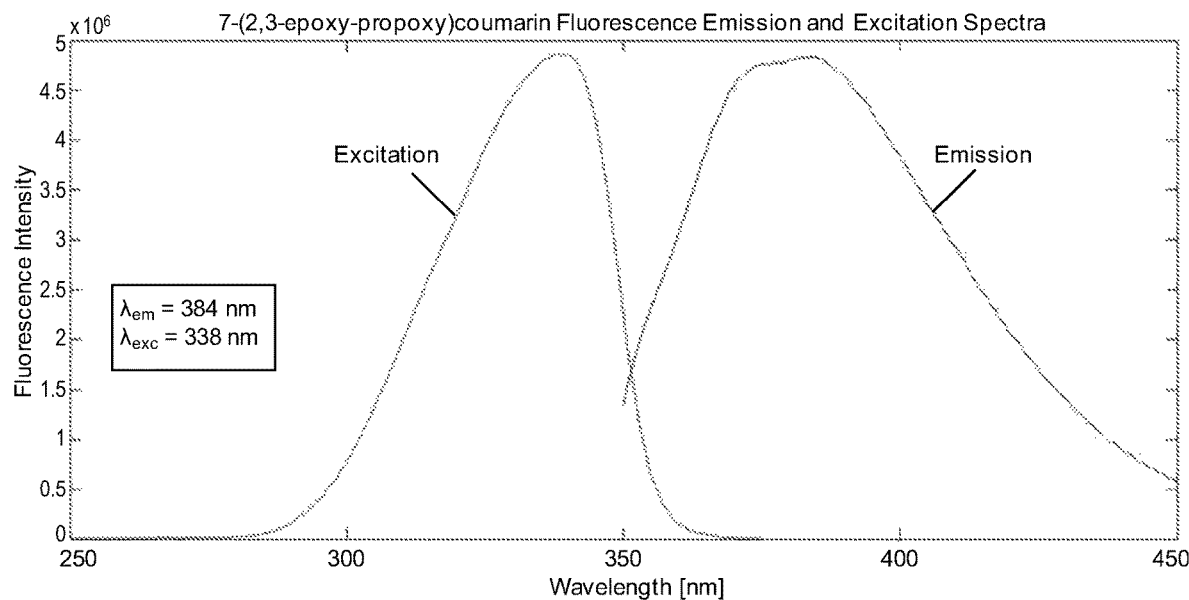
FIG. 3 shows fluorescence emission and excitation spectra for 7-(2,3-epoxypropoxy)coumarin, which is used interchangeably with 7-glycidyloxycoumarin.
Figure 4:
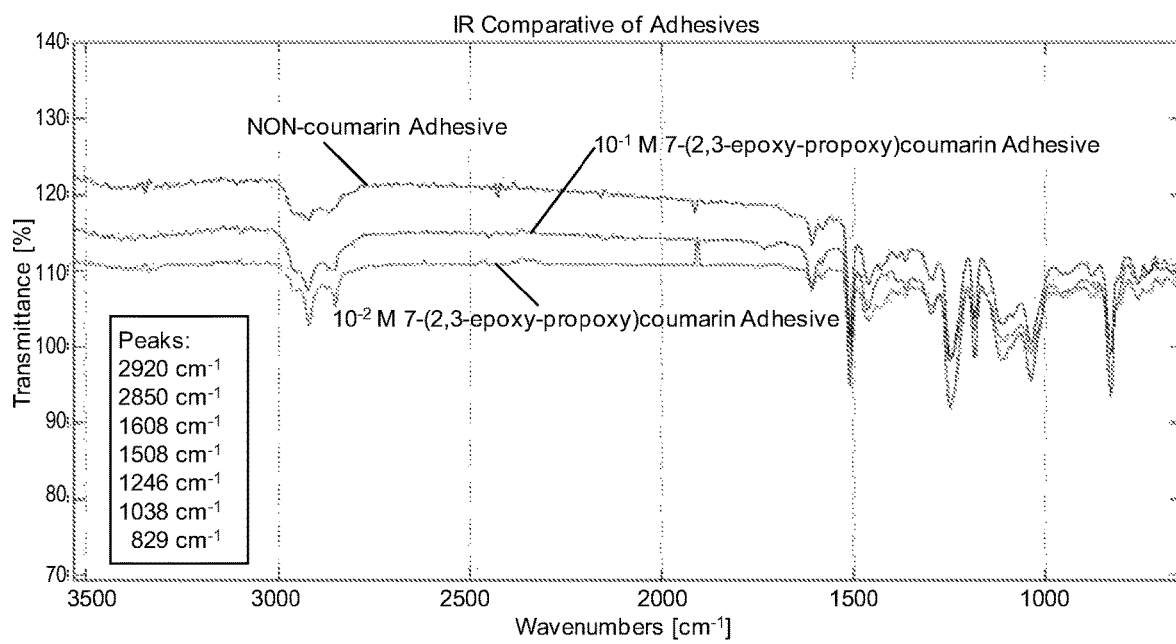
FIG. 4 shows a comparative IR absorption spectra for non-coumarin epoxy adhesive, $10^{-2}$ M 7-(2,3-epoxypropoxy)coumarin adhesive, and $10^{-1}$ M 7-(2,3-epoxypropoxy)coumarin adhesive.

The epoxy is set by mixing the epoxy precursor (A, 2.5 g, 7.21 mmol, EWW=173.42 g/equiv epoxide) with the hardening agent (B, 0.5 g, 3.16 mmol, EWW=39.57 g/eq NH) in a scintillation vial until homogeneous. This has a small excess (14.1%) of epoxide groups relative to the amine groups; ideally 0.5 g of hardener would be reacted with 2.19 g (6.32 mmol) of the epoxide. The addition of the 7-glycidyloxycoumarin to the hardener increases this deviation from the desired 2:1 stochiometry. The resulting solution of epoxide and hardener is clear and slightly transparent. For art conservation applications, as shown in FIG. 2, the adhesive is applied to substrates and pieces are held in place at 25° C. for 48 h for the viscous mixture to convert into a hard, insoluble, transparent thermoset. At 60° C., the curing only takes 2 h.

The present invention has successfully produced a fluorescent adhesive having good fluorescence for every type of adhesive. While every coumarin compound was expected to make the adhesives weaker, the fluorescent adhesive containing 7-glycidyloxycoumarin was surprisingly found to give the adhesive an extra strength at low concentrations of the coumarin ($10^{-3}$-$10^{-1}$ M), as well as good fluorescence.

Reworkable Coumarin-Modified Epoxy Adhesives

According to one embodiment of the present invention, liquid thermoset precursors are formed with at least two coumarin groups attached to organic oligoether or alkane through ether or amine linkages. Said liquid thermoset precursors may be used to form photocurable and cleavable (removable) thermosets. The key building block is the glycidyloxycoumarin (such as 4-methyl-7-(2,3-epoxypropoxy)coumarin) that is converted into a coumarin modified polyether, through Lewis acid catalyzed oligomerization of the epoxide group (Scheme 4), or coumarin-modified alkanes, polyethers, or siloxanes, through reaction of the epoxide group with amine groups attached to oligoethers, such as Jeff amines (Scheme 5), or alkanes substituted with amine groups, such as 1,6-diaminohexane (Scheme 6). For instance, the two epoxide groups can react with each primary amine group. It is to be understood that the glycidyloxycoumarin can be reacted with any epoxy hardening or curing agent to afford a liquid precursor.

Scheme 4. Formation of the coumarin-modified polyether.

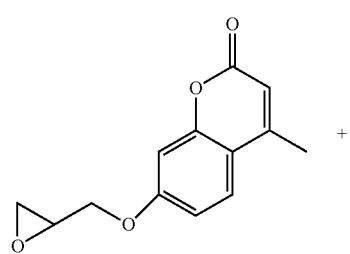

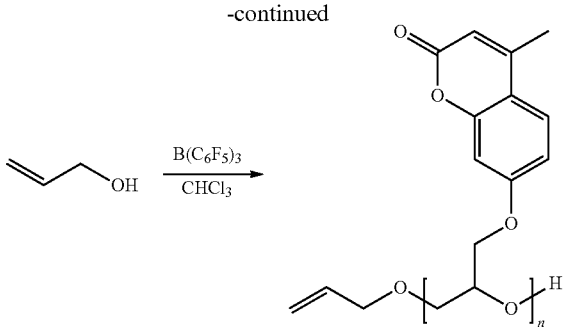

wherein n=2-100.

Scheme 5. Reaction of glycidyloxycoumarin with a Jeff amine.

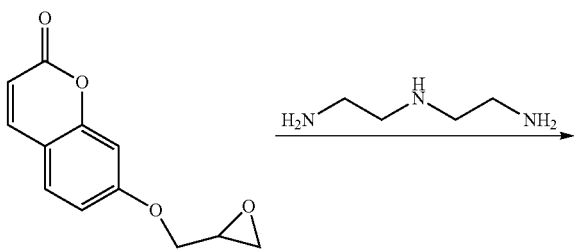

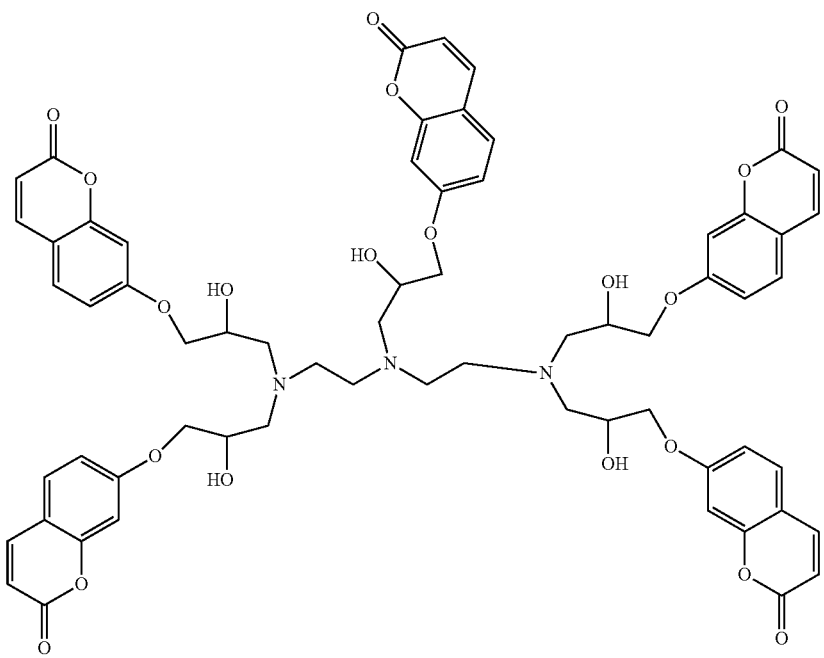

Scheme 6. Reaction of glycidyloxycoumarin with 1,6-diaminohexane.

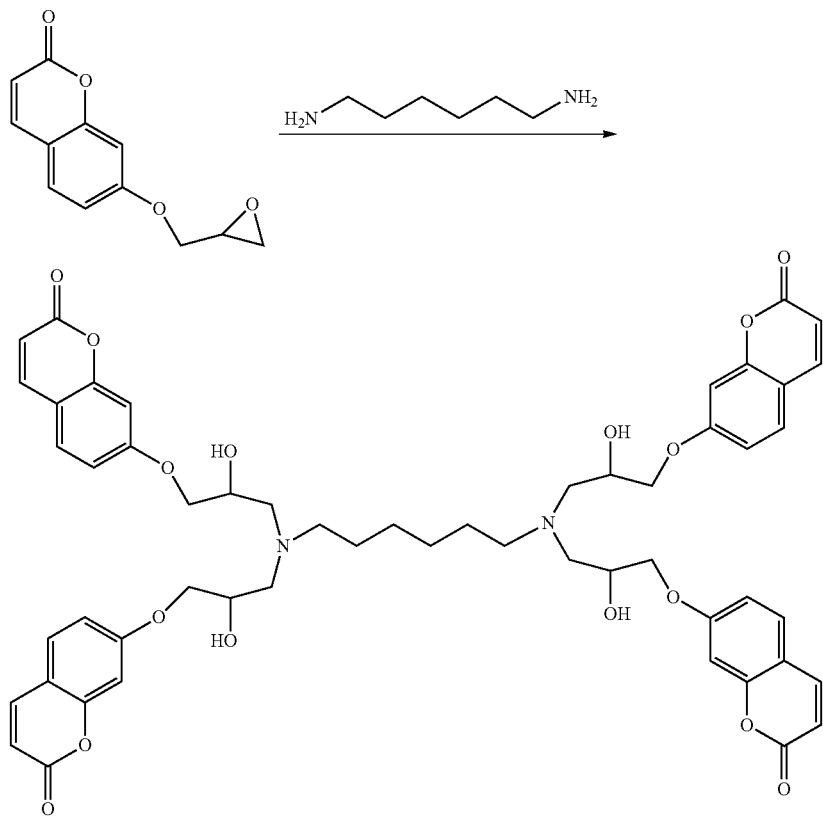

According to another embodiment, the present invention features a photochemically reworkable epoxy adhesive composition comprising a reactive mixture of a hardening agent, and one or more monomers of a modified coumarin comprising an epoxide moiety. The one or more monomers of the modified coumarin may be bonded to the hardening agent via the epoxide moiety. Without wishing to limit the invention to a particular theory or mechanism, the composition is curable under ultraviolet (UV) irradiation at a first range of wavelengths. Further still, the composition is photochemically degradable by UV irradiation at a second range of wavelengths, which causes the cured epoxy adhesive to undergo a reversible photoscission.

In a preferred embodiment, the modified coumarin comprises 7-glycidyloxycoumarin. In another embodiment, the reactive mixture further comprises a catalyst. In some embodiments, the first range of wavelengths may be greater than about 300 nm. In other embodiments, the second range of wavelengths may be less than about 300 nm.

In one embodiment, the composition may be cured at a specific temperature for a period of time. For example, the specific temperature for curing can range from about (40) to 90° C. In another embodiment, the period of time is less than about 10 minutes.

According to another embodiment, the present invention features a method of producing a photochemically reworkable epoxy precursor. The method may comprise providing a hardening agent, providing one or more monomers of a modified coumarin comprising an epoxide moiety, and mixing the hardening agent and the one or more monomers of the modified coumarin. In some embodiments, the method may further comprise adding a catalyst to the reaction of the hardening agent and the one or more monomers of the modified coumarin. Without wishing to limit the invention to a particular theory or mechanism, the hardening agent reacts with the one or more monomers of the modified coumarin such that the one or more monomers of the modified coumarin bonds to the hardening agent via the epoxide moiety, thereby forming the epoxy precursor.

Without wishing to limit the invention to a particular theory or mechanism, the epoxy precursor is curable upon exposure to ultraviolet (UV) radiation at a first range of wavelengths in which the epoxy precursor undergoes a crosslinking reaction to form a cured epoxy product. For instance, during curing, the epoxy precursor undergoes an intermolecular crosslinking of a 2+2 cycloaddition reaction to form a glassy, insoluble solid. In one embodiment, the epoxy precursor is cured at a specific temperature for a period of time. For example, the specific temperature for curing can range from about (40) to 90° C. and the period of time for curing may be less than 10 minutes.

Without wishing to limit the invention to a particular theory or mechanism, the cured epoxy product is reworkable upon further exposure to UV radiation at a second range of wavelengths in which the cured epoxy product undergoes a reversible photoscission to regenerate the epoxy precursor. Further still, the regenerated epoxy precursor can be re-curable with UV irradiation at the first range of wavelengths, and the re-formed cured epoxy product can be reworkable with UV irradiation at the second range of wavelengths to regenerate the epoxy precursor.

In a preferred embodiment, the modified coumarin may comprise 7-glycidyloxycoumarin. In one embodiment, the epoxy precursor may be in a form of a liquid. In some embodiments, the first range of wavelengths may be greater than about 300 nm. In other embodiments, the second range of wavelengths of UV may be less than about 300 nm. In another preferred embodiment, the cured epoxy product is insoluble, glassy solid. Further still, the cured epoxy product may be intractable. In some embodiments, the epoxy precursor may be used as a photocurable and photocleavable coating or adhesive.

In yet a further embodiment, the present invention features a method of reworking an epoxy material comprising a cured product of an epoxy precursor. In one embodiment, the method may comprise exposing the epoxy material to ultraviolet (UV) radiation at a range of wavelengths, thereby causing the epoxy material to undergo a reversible photo-scission to regenerate the epoxy precursor. In another embodiment, the epoxy precursor may comprise a hardening agent, and one or more monomers of a modified coumarin bonded to the hardening agent via an epoxide moiety of the modified coumarin. In some embodiments, the modified coumarin may comprise 7-glycidyloxycoumarin. In one embodiment, the range of wavelengths in less than about 300 nm. In another embodiment, the epoxy precursor can be re-curable by UV irradiation at wavelengths greater than about 300 nm.

Embodiments of the present invention may feature the epoxy-modified coumarin comprising 7-glycidyloxycoumarin. In other embodiments, the epoxy-modified coumarin may comprise a methyl or a hydrogen at a 4 position of the coumarin. In order to get the liquid precursors, the coumarin-modified oligomers generally must have less than ten coumarin groups per macromolecule and the overall molecule weight of the precursor is below 3000 Daltons. The mixture of stereoisomers formed from the nucleophilic attack and ring opening of the epoxy rings aids in keeping the precursor a liquid consistent with thermoset requirements.

Oligomerization of the epoxy group with Lewis acids, such as with tris(pentafluorophenyl)borane, trichloroaluminum, or scandium triflate, affords low molecular weight oligomers. The molecular weight of these oligomers can be controlled by the amount of initiator (alcohol in the case of the tris(pentafluorophenyl)borane) and catalyst used. Tris(pentafluorophenyl)borane catalyzed oligomerizations are effective because the Lewis acid does not react with the carbonyl group of the coumarin molecule.

Photochemical curing of the liquid, epoxy precursor is carried out by irradiating with ultraviolet light at wavelengths longer than 300 nm at temperatures between −40-90° C. The coumarin moieties photodimerize under these conditions to form a cyclobutane link where the carbon-carbon double bonds are in between the carbonyl and the coumarin benzene ring on the two coumarin groups involved. Having more than two coumarin groups per oligomer chain ensures that the precursor will form a cross-linked thermoset material that is insoluble and intractable.

To break the adhesive bonds, the cured thermoset is exposed to ultraviolet light at wavelengths less than 300 nm. This results in the coumarin dimer being broken apart to afford the two un-connected coumarin groups, thereby breaking the crosslinking that makes the thermoset insoluble and intractable. Generally, the thermoset will return to its original liquid state. The resulting re-formed liquid coumarin modified precursor can be re-cured with application of additional long wave ultraviolet light. This makes the coumarin modified precursors useful as reworkable thermosets.

In some embodiments, the hardening agent comprises an alcohol component, a polyether amine component such as a Jeff amine as shown in Scheme 5, or an aliphatic diamine component such as 1,6-diaminohexane as shown in Scheme 6. In one embodiment, the alcohol component may comprise an allyl alcohol. In preferred embodiments, when the alcohol component is used as the hardening agent, the formation of the epoxy adhesive precursor may further require a catalyst. The catalyst may comprise a Lewis acid, such as a tris(pentafluorophenyl)borane, a trichloroaluminum, or a scandium triflate. According to some embodiments, the coumarin-modified polyether can have a low molecular weight of below 3000 Daltons. The low molecular weight of the coumarin modified polyether can be controlled by the amount of the added alcohol component and the Lewis acid catalyst.

In some embodiments, the epoxy adhesive precursor may comprise a coumarin-modified polyether having the following structure:

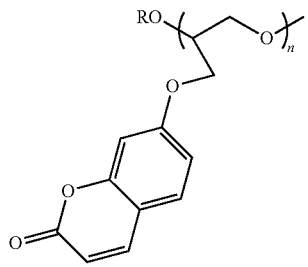

wherein R is allyl, alkyl, or aryl, and n=2-100.

In other embodiments, the epoxy adhesive precursor formed may comprise a coumarin-modified and amine-modified alkane having the following structure:

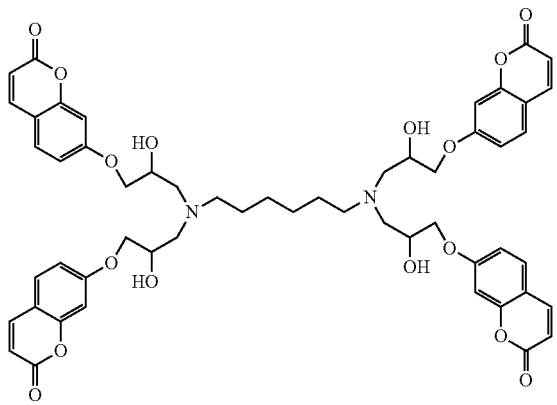 [SMILES: O=c1ccc2ccc(OCC(O)CN(CCCCCCN(CC(O)COc3ccc4ccc(=O)oc4c3)CC(O)COc3ccc4ccc(=O)oc4c3)CC(O)COc3ccc4ccc(=O)oc4c3)cc2o1]

In still other embodiments, the epoxy adhesive precursor formed may comprise a coumarin-modified and amine-modified alkane having the following structure:

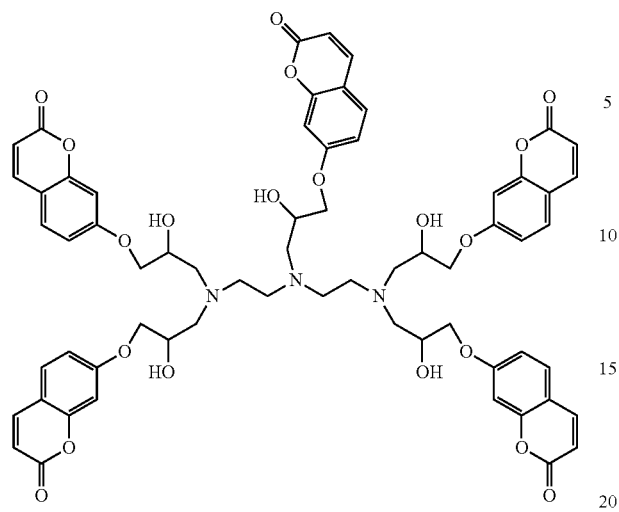

In further embodiments, the epoxy adhesive precursor may be formed into a glassy, insoluble solid by a 2+2 cycloaddition reaction of the coumarin-modified polyether as shown in Scheme 7.

Scheme 7.

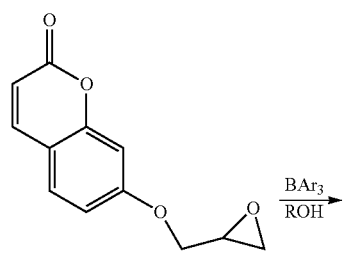

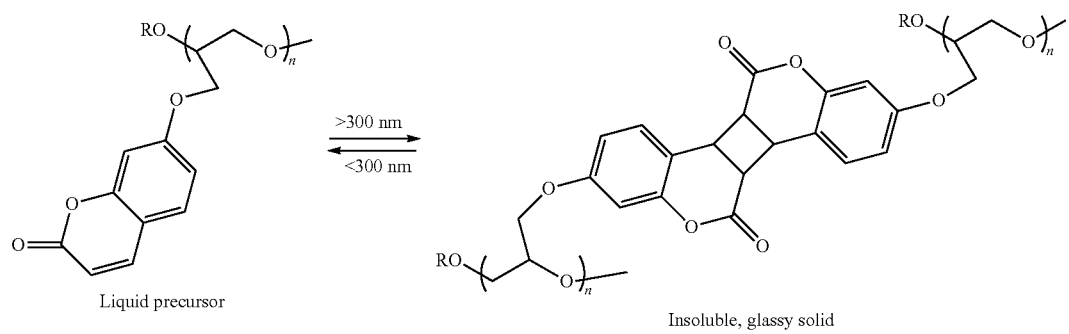

wherein R is an allyl, alkyl, or aryl, and n=2-100.

In still further embodiments, the epoxy adhesive precursor may be formed into a glassy, insoluble solid by the 2+2 cycloaddition reaction of the coumarin-modified and amine-modified alkane as shown in Scheme 8.

Scheme 8.

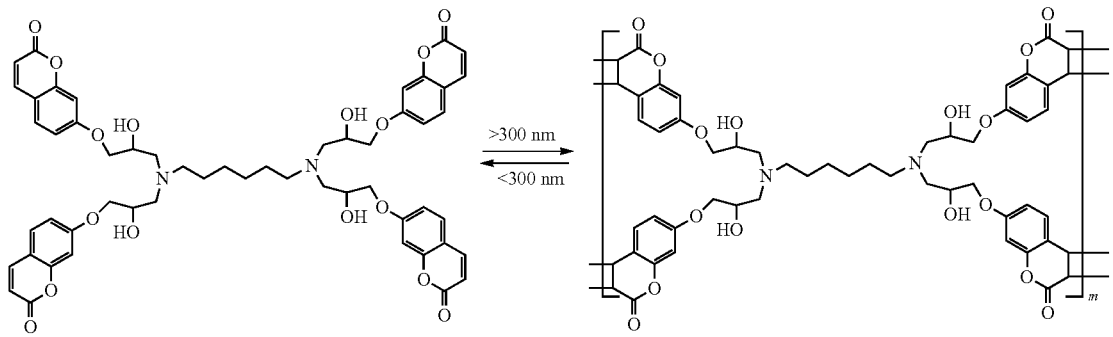

wherein m can range from about 3-10,000.

In an exemplary embodiment, the photochemically reworkable epoxy adhesive described herein can be applied to joints between a metal, a wood, or a ceramic substrate. The epoxy adhesive is effective for holding the pieces of the substrate in place. A thin film of the epoxy adhesive material can be irradiated to afford a hard thermoset within a few minutes of exposure. Curing of the epoxy adhesive may occur by illuminating the exposed precursor to UV irradiation, for instance, at a wavelength of about 350 nm, from the side of the substrate and allowing the adhesive to carry the UV radiation throughout the bond. The precursor can photobleach with dimerization allowing the UV to penetrate through the bond at (−40) to 90° C. and for a period of few minutes. If, for example, the epoxy adhesive is unintentionally applied and cured at an undesired location of a surface, the cured epoxy adhesive may be exposed to UV irradiation, for instance, at a wavelength of about 250 nm, which causes photoscission of the coumarin dimer into two un-connected coumarin groups. This breaks the crosslinking and regenerates the epoxy precurseor. The epoxy precursor can then be easily removed from the undesired location.

Example 5

The following is a non-limiting example of a Lewis Acid Catalyzed Ring-Opening Polymerization of 4-methyl-7-(2,3-epoxypropoxy)coumarin. It is to be understood that said examples are for illustrative purposes only, and are not intended to limit the invention in any way. Equivalents or substitutes are within the scope of the invention.

To a solution of 4-methyl-7-(2,3-epoxypropoxy)coumarin (500 mg, 2.15 mmol) in chloroform under nitrogen in a round bottom flask equipped with a stir bar and rubber septum, allyl alcohol (14.6 µL, 0.215 mmol) was added by syringe. The polymerization was started with the addition of tris(pentafluorophenyl)borane (11.0 mg, 0.0215 mmol) in dry chloroform by syringe. After about 4 hours at room temperature, the solution began to develop a pink color. After about 4 days, the solution turned dark red. To work up the polymerization, the solution was mixed with chloroform and washed once with HCl and twice with water. The organic layer was separated then dried over anhydrous $MgSO_4$ and rotary evaporated to yield a viscous red-pink material (0.452 g, 88%).

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

What is claimed is:

1. A fluorescent epoxy composition, said composition comprising a reactive mixture of:
   a. an epoxy resin;
   b. a hardening agent; and
   c. a fluorescent dye comprising an epoxide moiety, wherein the fluorescent dye is bonded to the hardening agent via reaction with the epoxide moiety;
whereupon cure of the reactive mixture to form a cured epoxy, the bonding of the fluorescent dye to the hardening agent increases a bond strength of the cured epoxy as compared to a cured epoxy without the fluorescent dye.

2. The composition of claim 1, wherein the fluorescent dye comprises 7-glycidyloxycoumarin.

3. The composition of claim 2, wherein a concentration of 7-glycidyloxycoumarin ranges from about 0.001 M-0.1 M.

4. The composition of claim 1, wherein a mole ratio of fluorescent dye to hardening agent to epoxy resin is about $10^{-4}$-$10^{-2}$ to 1 to 1.79-1.83.

5. The composition of claim 1, wherein the fluorescent dye is covalently bonded to the hardening agent.

6. The composition of claim 1, wherein the fluorescent dye causes the cured epoxy to fluoresce under shortwave ultraviolet irradiation.

7. The composition of claim 1, wherein the composition is an adhesive composition and the bond strength is an adhesive bond strength.

8. A method of making a two-part fluorescent epoxy comprising:
   a. providing an epoxy resin component; and
   b. preparing a fluorescent hardener component by providing a fluorescent dye comprising an epoxide moiety, and dissolving the fluorescent dye in a curing agent to form the fluorescent hardening agent, wherein the fluorescent dye is bonded to the curing agent via reaction with the epoxide moiety;

whereupon cure of a reactive mixture of said epoxy resin component and said fluorescent hardener component, the cured fluorescent epoxy has an increased bond strength as compared to a cured epoxy without the fluorescent dye, wherein the cured fluorescent epoxy fluoresces under shortwave ultraviolet irradiation.

9. The method of claim 8, wherein the fluorescent dye comprises 7-glycidyloxycoumarin.

10. The method of claim 9, wherein a concentration of 7-glycidyloxycoumarin ranges from about 0.001 M-0.1 M.

11. The method of claim 8, wherein a mole ratio of fluorescent dye to hardening agent to epoxy resin is about $10^{-4}$-$10^{-2}$ to 1 to 1.79-1.83.

12. The method of claim 8, wherein the epoxy is an adhesive and the bond strength is an adhesive bond strength.

13. A method of producing a photochemically reworkable epoxy precursor, said method comprising:
   a. providing a hardening agent;
   b. providing one or more monomers of a modified coumarin comprising an epoxide moiety; and
   c. mixing the hardening agent and the one or more monomers of the modified coumarin, wherein the hardening agent reacts with the one or more monomers of the modified coumarin such that the one or more monomers of the modified coumarin bonds to the hardening agent via the epoxide moiety, thereby forming the epoxy precursor;

wherein the epoxy precursor is curable upon exposure to ultraviolet (UV) radiation at a first range of wavelengths in which the epoxy precursor undergoes a crosslinking reaction to form a cured epoxy product, wherein the cured epoxy product is reworkable upon further exposure to UV radiation at a second range of wavelengths in which the cured epoxy product undergoes a reversible photoscission to regenerate the epoxy precursor.

14. The method of claim 13, wherein the modified coumarin comprises 7-glycidyloxycoumarin.

15. The method of claim 13, further comprising adding a catalyst to the reaction of the hardening agent and the one or more monomers of the modified coumarin.

16. The method of claim 13, wherein the epoxy precursor is in a form of a liquid.

17. The method of claim 13, wherein the first range of wavelengths is greater than about 300 nm.

18. The method of claim 13, wherein the second range of wavelengths of UV is less than about 300 nm.

19. The method of claim 13, wherein the regenerated epoxy precursor is re-curable with UV irradiation at the first range of wavelengths, and wherein the re-formed cured epoxy product is reworkable with UV irradiation at the second range of wavelengths to regenerate the epoxy precursor.

* * * * *